INVENTOR.
J. W. BEGLEY
BY Hudson and Young
ATTORNEYS

March 12, 1957

J. W. BEGLEY 2,785,212

REGENERATIVE FURNACE AND PRODUCTION
OF UNSATURATED HYDROCARBONS THEREIN

Filed Nov. 29, 1954

INVENTOR.
J.W. BEGLEY

BY *Hudson and Young*

ATTORNEYS

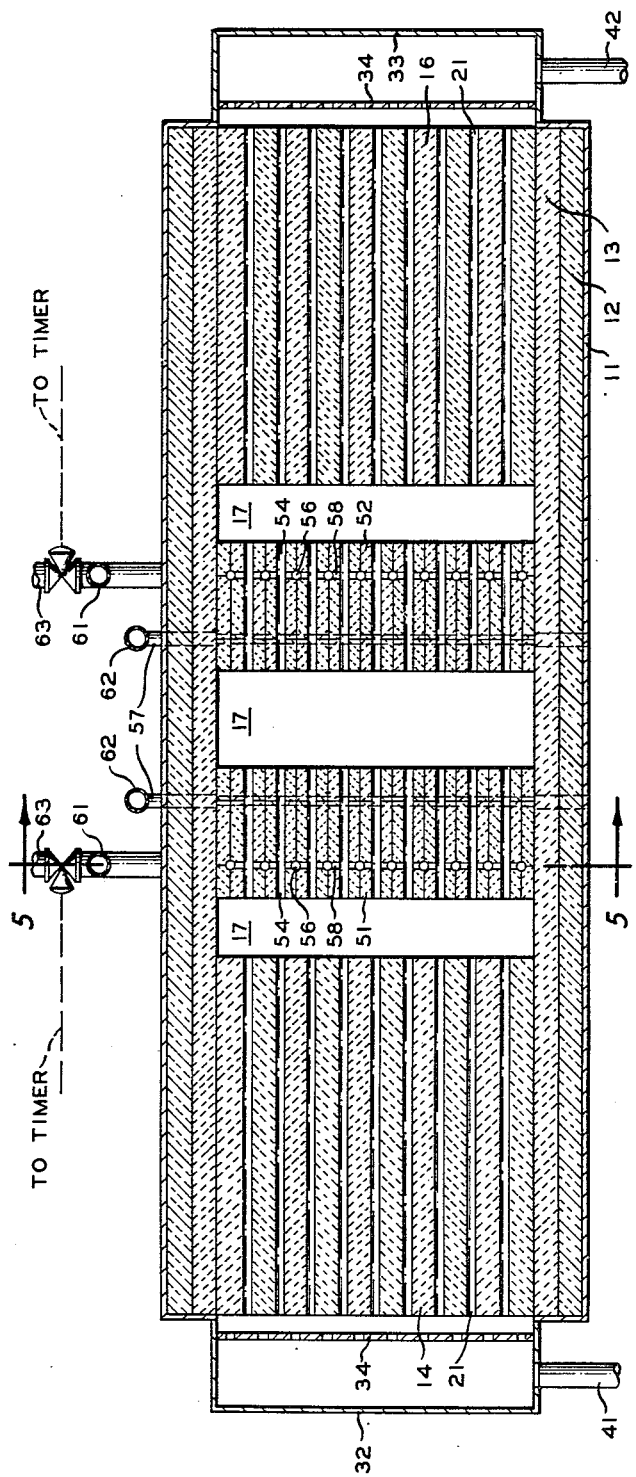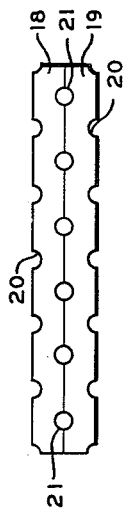

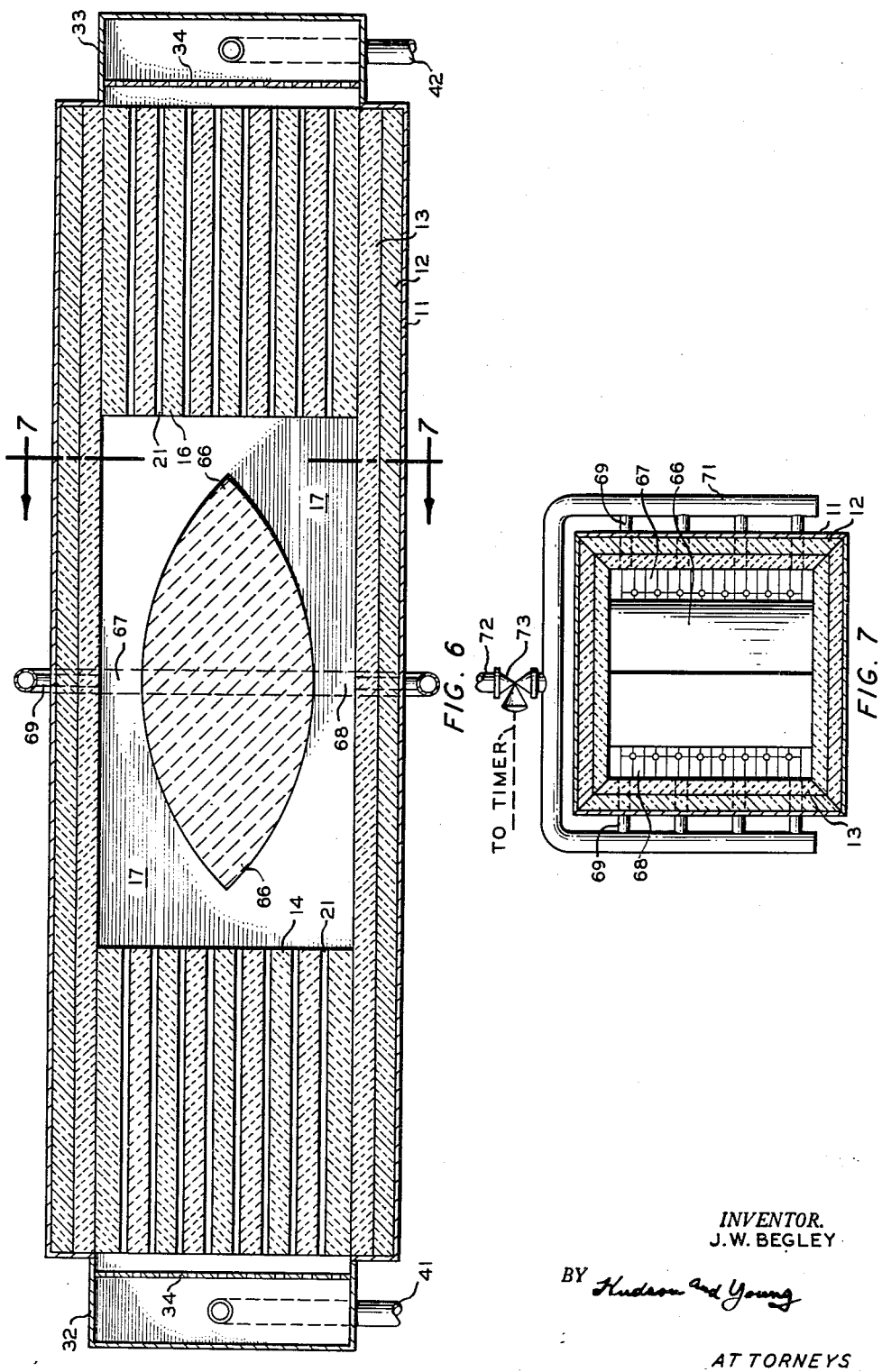

United States Patent Office 2,785,212
Patented Mar. 12, 1957

2,785,212

REGENERATIVE FURNACE AND PRODUCTION OF UNSATURATED HYDROCARBONS THEREIN

John W. Begley, Ann Arbor, Mich., assignor to Phillips Petroleum Company, a corporation of Delaware Application November 29, 1954, Serial No. 471,816

18 Claims. (Cl. 260—679)

This invention relates to the conversion of hydrocarbons. In one of its more specific aspects, it relates to a novel regenerative furnace for use in the thermal cracking of hydrocarbons. In another of its more specific aspects, it relates to means for distributing fuel uniformly across the combustion section of a regenerative furnace.

During the early years of the petroleum industry, the possibility of producing unsaturated hydrocarbons by the cracking of low boiling hydrocarbons received comparatively little attention. Because of apparatus limitations imposed by the high reaction temperatures involved and the lack of understanding of the best manner of operation, early developments excluded the cracking of low boiling hydrocarbons. Still another deterrent in the development of successful processes was the availability of vast supplies of heavy naphthas which could be cracked by more easily manageable processes to form easily purifiable products in high yield. Recent advancements made in organic chemistry have resulted in such an increased demand for petro-chemical starting materials, such as acetylene and ethylene, that it is no longer possible to rely on the old sources of supply for these materials. The demand for ethylene has reached such proportions that it cannot be supplied from refinery streams without upsetting the balance in the production of motor and aviation fuels. Furthermore, commercial production of acetylene by reacting calcium carbide with water is too expensive and is limited to amounts far too low to satisfy the demand for acetylene as a chemical synthesis starting material. Accordingly, the development of successful processes for producing unsaturated hydrocarbons by the cracking of low boiling hydrocarbons has in recent years taken on added importance.

Various methods for the pyrolysis of gaseous hydrocarbons have been proposed which involve the use of a variety of heat sources, including externally heated tubes, electrically heated resistance elements, and spark or electrical discharges. The lack of cheap electric power has also drawn attention to other possible methods of heating, such as by the combustion of preheated natural gas with preheated compressed air. In such latter processes when utilizing regenerative furnaces, a stream of air and fuel gas is burned in, or hot combustion products passed through, a refractory checkerwork so as to heat it to a high temperature. After the hot gases have heated the checkerwork to the desired temperature, the flow of combustion gases is terminated, and thereafter the reactant materials to be treated are passed through the heated checkerwork in order to bring the materials to reaction temperature.

In a particularly useful regenerative furnace of this type, utilized for the thermal cracking of hydrocarbons, such as methane, ethane, propane or butane, to produce unsaturated hydrocarbons, such as ethylene or acetylene, an elongated checkerwork of refractory material is provided at either end of a central combustion chamber. Air is passed in one direction through one of the checkerwork structures while a fuel gas is introduced into the central combustion chamber. The fuel gas and air burn in the combustion chamber, and thereafter the resulting combustion gases flow through one of refractory checkerworks. When this checkerwork has reached the desired temperature, the flow of air and fuel is terminated, and the materials to be cracked or otherwise converted are passed in the opposite direction through the heated refractory where the desired cracking or other reaction occurs.

After a timed reaction period, the flow of reactant materials is stopped, and air is passed through the furnace in a direction opposite to that of its first introduction. At the same time, fuel gas is introduced into the central combustion chamber to mix with the air and form a combustible mixture which is burned therein to form hot combustion gases to heat the refractory checkerwork downstream of the combustion chamber. When the checkerwork attains the desired temperature, the materials to be converted are passed through the heated refractory.

When using a regenerative furnace of the type described, having a central combustion chamber disposed between a pair of similar refractory checkerworks, for cracking light hydrocarbons, difficulty has been encountered in obtaining a uniform distribution of heat in the refractory masses. This unsatisfactory condition arises from the fact that on the regeneration cycle the combustion gases resulting from burning fuel gas and air within the combustion chamber have a tendency to channel through a portion only of the refractory masses, thereby causing some parts of the refractories to be heated to higher temperatures than other parts. Furthermore, the combustible mixture formed by the introduction of air and fuel into the central combustion chamber may be of non-uniform composition which will also result in non-uniform temperature across the cross section of the furnace. Such uneven heating may result in damage to the refractories and additionally may have a deleterious effect upon the cracking reaction. With regard to the effect of non-uniform heating of the refractories upon the cracking reaction, during the process cycle, portions of the hydrocarbon feed are heated to higher temperatures than others, resulting in overcracking and undercracking of the feed. The net result of such a reaction is a low product yield accompanied by the formation of carbonaceous materials, which over a period of time renders the furnace inoperative. In accordance with this invention, means are provided for uniformly mixing the fuel and air or the hotter and colder combustion gases before they contact the main refractory masses in the cracking sections of the furnace. The heat is thereby evenly and uniformly distributed throughout the refractory masses, resulting in an efficient cracking reaction in which secondary reactions are reduced to a minimum.

The following are objects of the invention.

It is an object of the invention to provide an improved regenerative furnace for use in the thermal conversion of hydrocarbons.

Another object of the invention is to provide an improved method for the thermal conversion of hydrocarbons whereby overcracking and undercracking of the reactant materials are substantially eliminated.

Still another object of the invention is to provide means for distributing fuel uniformly across the combustion section of a regenerative furnace.

Yet another object of the invention is to provide means for uniform mixing of fuel and air and of combustion gases prior to their contacting the main refractory masses of a regenerative furnace.

A further object of the invention is to provide means for obtaining uniform and even heating of the refractories of a regenerative furnace by preventing channeling of the gases through any one portion of the furnace.

A still further object of the invention is to provide a regenerative furnace which includes means for distributing the gases evenly and uniformly throughout the furnace.

Still further objects and advantages of the invention will become apparent to one skilled in the art upon consideration of the following disclosure.

Broadly speaking, the present invention resides in a novel regenerative furnace which includes means for obtaining uniform heating of the refractory masses and the use of such a furnace in processes for the conversion of hydrocarbons. The regenerative furnace of my invention comprises a pair of refractory checkerworks separated by a combustion chamber having constricted passageways formed therein and having fuel inlets connected thereto for injecting fuel into air flowing through the constricted passageways. In accordance with one modification of the invention, there are disposed within the combustion chamber two short refractory masses having longitudinal, parallel passageways into which fuel is injected through conduits connecting the passageways to tubes which are in turn connected to a source of fuel gas. The aforesaid tubes extend through the short refractory masses between the longitudinal passageways either transversely from side to side or vertically from top to bottom. In another modification of the invention, two sets of tubes are utilized with each of the short refractory masses, one set extending transversely from side to side and the other vertically from top to bottom. In still another modification of the invention, a refractory column or core, elliptical in shape, is positioned within the combustion chamber so as to form a pair of constricted pasageways with two of the chamber walls. A plurality of fuel inlets connected to the combustion chamber provide means for introducing fuel into the constricted passageways.

A more complete understanding of the invention may be obtained by reference to the following description and the drawing, in which:

Figure 3 is an end view of refractory tiles suitable for use in the regenerative furnace of this invention;

Figure 4 is an elevation, in section, of a regenerative furnace in accordance with another modification of the invention;

Figure 6 is a plan view, in section, of a regenerative furnace in accordance with still another modification of the invention; and Figure 7 is a cross-sectional view taken along line 7—7 of Figure 6.

Figure 1:
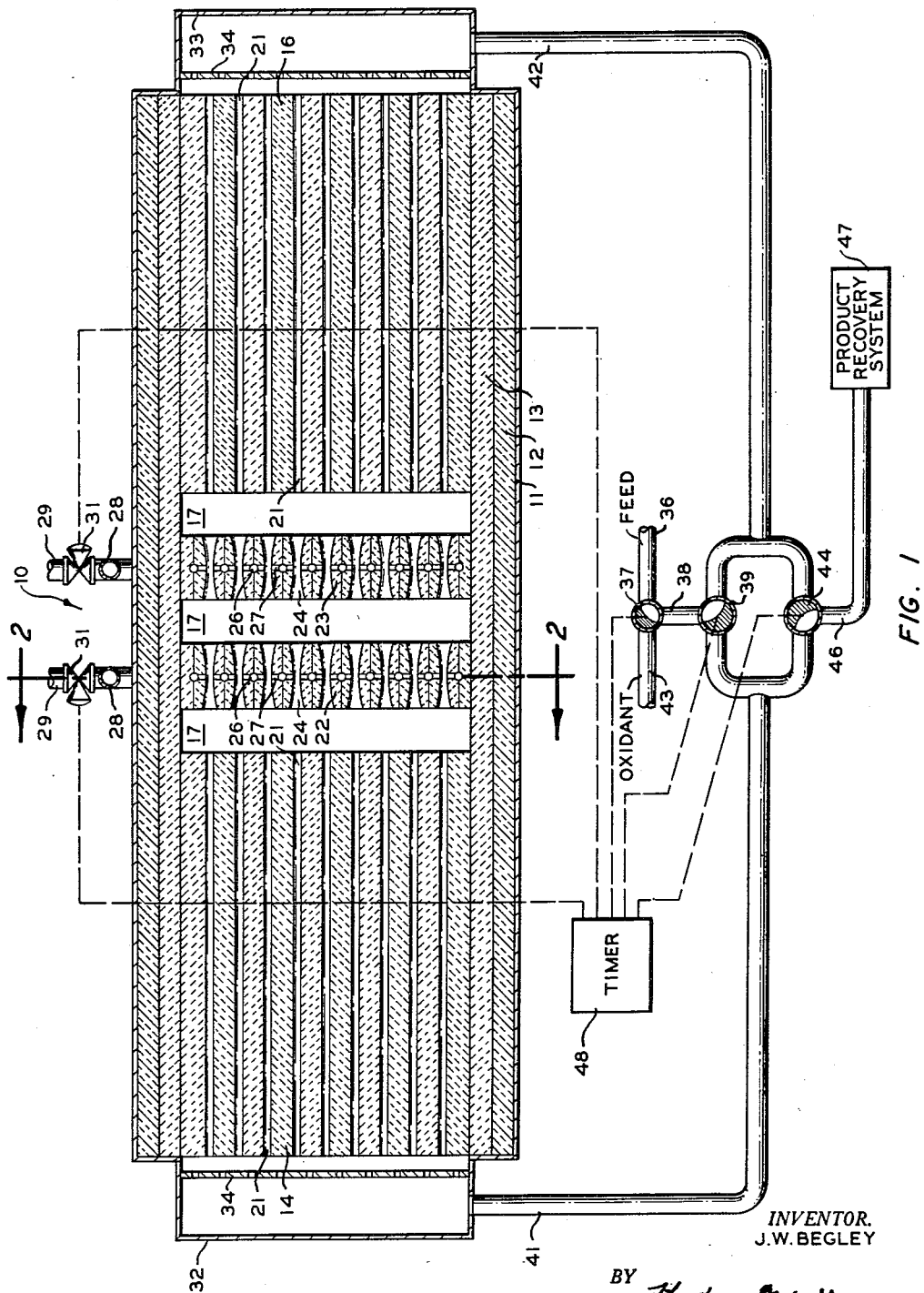
Figure 1 is an elevation, partially in section, of a regenerative furnace in accordance with one modification of the invention.
Figure 2:
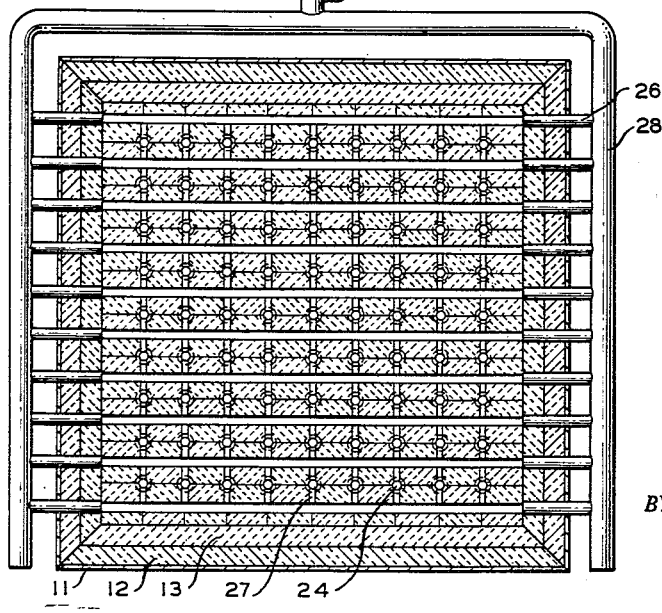
Figure 2 is a cross-sectional view taken along line 2—2 of Figure 1.

Referring now to the drawing, and in particular to Figures 1 and 2, a regenerative furnace 10 is illustrated which comprises a shell 11 lined with insulating material, such as two layers 12 and 13 of firebrick. The inner layer 13 of insulating material is formed of a more refractory material than outer layer 12. Disposed within insulated shell 11 are refractory masses 14 and 16 separated by a combustion space or chamber 17. Refractory masses 14 and 16 are formed of refractory tiles similar to tiles 18 and 19, as shown in Figure 3, which are arranged within the furnace with their longitudinal axes parallel to the longitudinal axis of shell 11. The upper and lower faces of the tiles are provided with semicircular grooves 20 so that when the tiles are placed on top of one another within shell 11, there is formed a series of openings 21. As shown in Figure 1, openings 21 extend longitudinally through the refractory masses so as to provide passageways therethrough which communicate with combustion chamber 17.

Refractory masses 22 and 23, each similarly constructed but shorter in length than main refractory masses 14 and 16, are positioned within combustion space 17. Refractory masses 22 and 23 are spaced apart from one another and from the inner ends of refractory masses 14 and 16. Longitudinal passageways 24, substantially parallel to the longitudinal axis of the furnace, are provided in refractory masses 22 and 23. Longitudinal passageways 24, as illustrated, each take the form of a venturi comprising a converging section, a throat section and a diverging section. While it is preferred to use venturi-like constricted passageways in the short refractory masses in order to obtain a more efficient mixing of the fuel and oxidant, it is within the scope of the invention to utilize passageways substantially cylindrical in form. Tubes 26 extend through each of the refractory masses 22 and 23 between passageways 24 and substantially perpendicular to the axes of these passageways. While tubes 26 are shown as extending transversely across refractory masses 22 and 23, it is to be understood that, alternatively, the tubes may pass through the refractory masses vertically from top to bottom without departing from the scope of the invention. Conduits 27 connect passageways 24 with tubes 26, which are in turn connected to a header member 28, as shown in Figure 2. A fuel inlet line 29, affixed to header member 28 and containing a valve 31, provides means for passing a fuel gas into tubes 26 and thence into passageways 24 through conduits 27. As illustrated in Figure 1, each of the refractory masses 22, 23 is provided with a header member 28 connected to a fuel inlet line 29. Refractory masses 22 and 23 and their associated passageways 24, tubes 26, conduits 27 and header members 28 each constitute fuel distribution means.

Plenum chambers 32 and 33, connected to the ends of the regenerative furnace of Figure 1, provide means for introducing reactant materials into the furnace. Each of the plenum chambers may be provided with a perforated distributor plate 34 to ensure even distribution of the reactant materials through the refractory masses.

Conduit 36, through which hydrocarbon feed material is introduced, is connected by a three-way valve 37 to a conduit 38. Conduit 38 in turn is connected through a three-way valve 39 to a conduit 41 which communicates with plenum chamber 32 or, alternatively, to a conduit 42 which communicates with plenum chamber 33. Valve 37 is also adapted to attach oxidant conduit 43 to conduit 38 and, thence, to conduits 41 and 42, as determined by the setting of valve 39. Conduits 41 and 42 are also selectively connected by a three-way valve 44 to an effluent conduit 46 which leads to a product recovery system 47, or other disposal, as desired. Timer 48 is operatively connected to each of the valves 31 contained in fuel inlet lines 29 associated with each of the fuel distribution means and to three-way valves 37, 39 and 44 to provide alternate regeneration and process cycles. A timer suitable for controlling the cycles of operation is manufactured by Taylor Instrument Companies, Rochester, New York.

Figure 5:
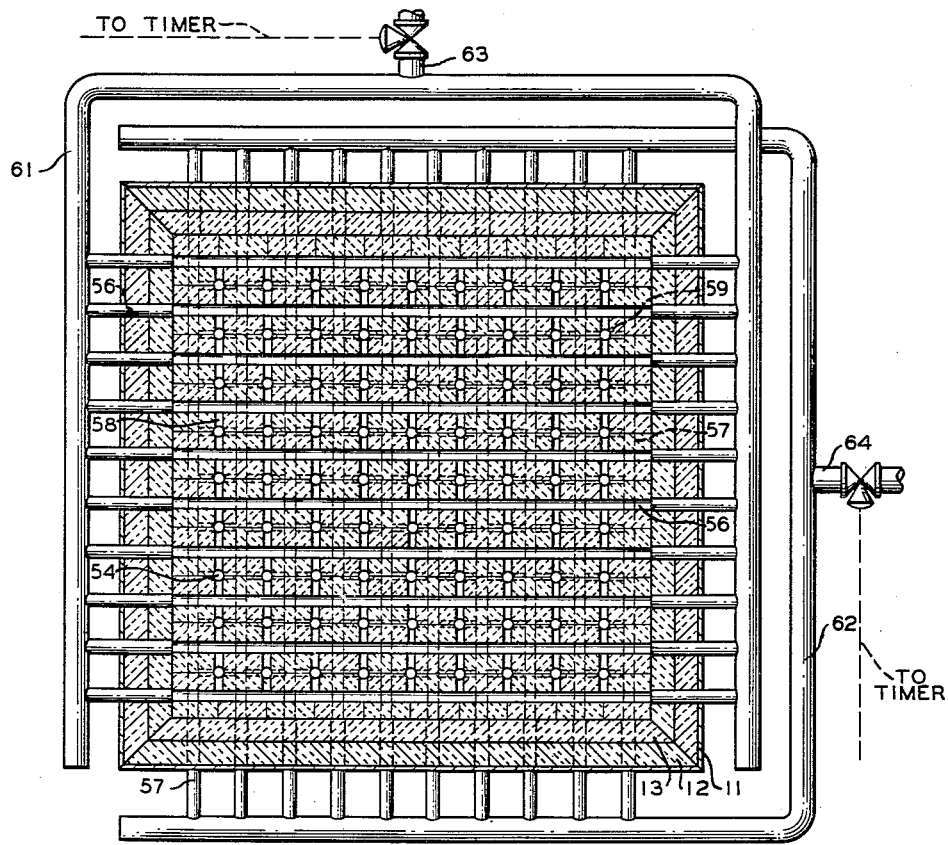
Figure 5 is a cross-sectional view taken along line 5—5 of Figure 4.

Referring to Figures 4 and 5 of the drawing, there is shown another modification of the regenerative furnace of this invention. Identical reference numerals have been used to designate elements corresponding with those described in conjunction with Figure 1. Refractory masses 51 and 52 disposed within combustion space 17 are provided with longitudinal parallel passageways 54. While passageways 54 are illustrated as being substantially cylindrical in shape, they may be in the form of a venturi as shown in Figure 1. Tubes 56 extend transversely through refractory masses 51 and 52 between passageways 54 while tubes 57 extend vertically from top to bottom through the refractory masses between passageways 54. It is noted that transverse tubes 56 and vertical tubes 57 are offset longitudinally from one another so that the two sets of tubes do not intersect within the refractory masses. Conduits 58 communicate transverse tubes 56 with longitudinal passageways 54 while conduits 59 connect vertical tubes 57 with the same passageways, as shown in Figure 5. Transverse tubes 56 terminate in header member 61 while vertical tubes 57 are connected to header member 62. Fuel inlet lines 63 and 64, each provided with suitable flow control means and attached to header members 61 and 62, respectively, provide means for introducing a fuel gas into the header members and thence into passageways 54 through transverse tubes 56 and vertical tubes 57 and conduits 58 and 59 connecting the tubes to the longitudinal passageways. As illustrated in Figure 4, each of the refractory masses 51, 52 is provided with a pair of header members 61, 62 connected to tubes 56 and 57, respectively. While a pair of header members are shown as being connected to the transverse and vertical tubes associated with each of the refractory masses 51 and 52, it is within the scope of the invention to utilize a single plenum chamber which encompasses the ends of tubes 56 and 57 of each fuel distribution means in order to provide for the introduction of a fuel gas. It is to be understood that conduits 41 and 42 connected to plenum chambers 32 and 33 can be further connected to a supply of oxidant and feed material through a valve system, as shown in Figures 1 and 2, and that a timer can be used in conjunction therewith to control the cycles of operation.

Referring to Figures 6 and 7 of the drawing, still another modification of the regenerative furnace of this invention is illustrated. Identical reference numerals have been used to designate elements corresponding to those described in conjunction with Figure 1. A refractory column or core 66 having a substantially elliptical horizontal cross-section is disposed within combustion space 17 so as to form constricted passageways 67 and 68 with the side walls of the combustion chamber. It is noted that the long axis of the elliptical cross-section of the column is substantially parallel to the axis of the furnace and that the constricted passageways are each shaped as half-venturi sections. While column 66 is shown as extending substantially vertically between the top and bottom walls of the combustion chamber, it is to be understood that the column may be disposed between the side walls of the chamber so as to form constricted passageways with the top and bottom walls of that chamber. A plurality of fuel inlets 69, connected to each of the side walls of the furnace, communicate with constricted passageways 67 and 68, preferably at the narrowest portion of these passageways. As illustrated in Figure 7, a header member 71 is connected to each of the fuel inlets 69 and to fuel inlet line 72 which is provided with a flow control means 73. It is to be understood that conduits 41 and 42 connected to plenum chambers 32 and 33 can be further connected to a supply of oxidant and feed material through a valve system, as shown in Figures 1 and 2, and that a timer can be used in conjunction therewith to control the cycles of operation.

The regenerative furnaces of this invention are especially adapted for carrying out processes for the production of unsaturated hydrocarbons, such as acetylene, ethylene, and mixtures of acetylene and ethylene. The reaction temperatures for such processes will vary in the approximate range of 1250° F. to 2700° F. More specifically, in the acetylene process, the reaction temperature is preferably maintained between about 2200° F. and 2700° F., in the process for the production of acetylene and ethylene, between about 1700° F. and 2200° F., and in the ethylene process, between about 1250° F. and 1700° F. The reaction times for the several processes are in the following approximate ranges: for acetylene, between 0.0001 and 0.2 second; for a mixture of acetylene and ethylene, between 0.01 and 0.2 second; and for ethylene, between 0.01 and 2 seconds. From this consideration of reaction temperatures and reaction times, it is apparent that the reaction times vary inversely with the reaction temperatures, i. e., the higher the reaction temperature, the shorter the reaction time.

A wide variety of hydrocarbon feed stocks can be used in the practice of the processes of this invention. Those which can be suitably used include methane, ethane, propane, butane and mixtures of these hydrocarbons and/or their corresponding olefins. It is to be understood, however, that any vaporizable or gaseous hydrocarbons can be advantageously employed as the feed. It is also within the contemplation of the invention to use a diluent such as steam with the hydrocarbon feed in order to reduce the deposition of carbonaceous materials within the furnace.

Oxidants which can be used in the process of this invention include oxygen, air, and oxygen-enriched air. Any suitable fuel, preferably a clean burning fuel, can be utilized in the practice of this invention. Gaseous or liquid hydrocarbons are preferably used as fuels, and process off-gases from the process of this invention or other processes can be advantageously employed. When using a liquid hydrocarbon, the fuel is introduced into the furnace in vaporized form.

In the operation of the regenerative furnace of Figure 1, during the regeneration cycle three-way valves 37 and 39 are in such a position that an oxidant, such as air, is forced by a blower (not shown) through conduits 43, 38 and 41 into plenum chamber 32, from which it passes into passageways 21 of refractory mass 14. Plenum chamber 32 and perforated distributor plate 34 disposed therein provide for even distribution of air across the face of refractory mass 14 and assure even flow of air therethrough. It is assumed that the furnace has been previously brought to operating temperature during a start-up cycle in which fuel and air passed into the furnace are ignited by a suitable ignition means, e. g., a burning torch introduced into the combustion chamber. The resulting combustion products are then passed through the furnace until it is preheated to the desired temperature.

The air, in passing through refractory mass 14, is heated to a temperature at least as high as the ignition temperature of a fuel gas to be introduced into passageways 24 of refractory mass 22. The heated air issuing from refractory mass 14 is redistributed in refractory mass 22 and mixed with a fuel gas in passageways 24 of this refractory mass. The fuel gas, which may be preheated, is introduced into passageways 24 of refractory mass 22 through fuel inlet line 29, header member 28, tubes 26 and conduits 27. The air and fuel are mixed within passageways 24, forming a combustible mixture which burns therein and in the space between refractory masses 22 and 23. By introducing fuel into a plurality of air streams in this manner a thorough mixing of air and fuel is obtained so as to provide a combustible mixture of uniform composition. The resulting combustion products are redistributed by means of refractory mass 23, passing through passageways 24 of this mass prior to entering refractory mass 16. As a result of the redistribution of the combustion gases by refractory mass 23, channeling of the gases through one portion only of refractory mass 16 is prevented, and the gases flow evenly and uniformly therethrough. And because of this uniform and even flow of combustion gases through refractory mass 16, substantially no differential in temperature exists across any cross section of the refractory mass. After passing through refractory mass 16 and heating same to the desired temperature, the combustion products flow into plenum chamber 33 and, thence, through conduits 42 and 46 into product recovery system 47 where they may be used for heating or other purposes.

At the conclusion of a predetermined time interval, as determined by the setting of timer 48, valve 37 is actuated by the timer to transfer conduit 38 from its connection with conduit 43 to a connection with conduit 36.

The timer also operates to close valve 31 in the fuel inlet line 29 of header member 28 associated with refractory mass 22 and to reverse the settings of valves 39 and 44 so that conduit 38 is connected to conduit 42 and conduit 41 is connected to conduit 46. An interval of one minute is a suitable reaction period and regeneration period for the cracking of propane to form acetylene. The time interval will, in general, depend upon the specific process being carried out and the particular hydrocarbon feed being converted. As a result of the movement of valves 37 and 39, the process cycle commences, and hydrocarbon feed and steam, if desired, now pass through conduits 36, 38 and 42 into plenum chamber 33. As previously mentioned, the combination of the plenum chamber and distributor plate 34 provides for even flow of gases through refractory mass 16. On contacting hot refractory mass 16, the hydrocarbon feed is raised to the desired cracking temperature and undergoes reaction. The cracked hydrocarbon feed thereafter passes into combustion space 17 and through passageways 24 of refractory masses 23 and 22. In passing through refractory masses 22 and 23, the reaction products are redistributed prior to entering main refractory mass 14 which has previously been cooled on the regeneration cycle by passage of air therethrough. In flowing through refractory mass 14, the reaction products are rapidly quenched to a temperature at which they are stable, e. g., to a temperature in the range of about 400° F. to 1000° F. The reaction products then flow into plenum chamber 32 and are subsequently passed through conduits 41 and 46 to product recovery system 47 for separation of the product gas from the reaction products.

At the end of the predetermined time interval, timer 48 operates to change the setting of valve 37 so that air is now introduced into the regenerative furnace through conduit 42 to start the regeneration cycle. The timer functions also to open fuel valve 31 contained in fuel inlet line 29 of header member 28 associated with refractory mass 23, thereby allowing fuel to flow into passageways 24 of refractory mass 23. The regeneration cycle is carried out in the same manner as previously described except that air is now introduced into the regenerative furnace from an end opposite to its first introduction, and fuel is introduced into the longitudinal passageways of refractory mass 23 rather than refractory mass 22. After the regeneration cycle is completed, the process cycle is begun by timer 48 operating to close fuel valve 31 and to change the settings of valves 37, 38 and 44, thereby permitting hydrocarbon feed to enter the furnace through conduit 41 and the effluent to pass to product recovery system 47 through conduits 42 and 46. The regeneration and process cycles are thereafter repeated at the predetermined time intervals to produce the desired product.

The operation of the apparatus of Figure 4 is essentially the same as that of Figure 1 except for the manner in which fuel gas is introduced into the furnace. Accordingly, during the regeneration cycle fuel gas is introduced into passageways 54 through transverse tubes 56 and conduits 58 and through vertical tubes 57 and conduits 59. Fuel gas is, therefore, being injected into longitudinal passageways 54 of refractory masses 51 or 52, as applicable, at four different points with the result that an increased turbulence is set up within the passageways of the refractory masses. Because of this increased turbulence, a more thorough mixing of the fuel and air is made possible, and a more efficient combustion reaction takes place.

The operation of the apparatus of Figure 6 is very similar to that of Figure 1 except for the manner in which the fuel gas is introduced into the furnace. Thus, during the regeneration cycle fuel gas is introduced into constricted passageways 67 and 68 of combustion space 17 through fuel inlets 69. The air on entering the combustion chamber flows around elliptical column 66 near either side of the furnace, attaining its greatest velocity in the narrowest portion of the constricted passageways. As previously noted in conjunction with the description of Figure 6, the fuel is preferably introduced into the constricted passageways at their narrowest portion. The fuel and air impinge in the narrowest portions of the constricted passageways creating therein a condition of extreme turbulence with the result that the fuel and air are rapidly and uniformly mixed. By operating in this manner, uniform mixing of the gases is accomplished before they contact the main refractory masses of the furnace, and the mixing is done in a shorter distance than would be required if constricted passageways were not provided in the combustion space.

It will be apparent that by utilizing the regenerative furnace of this invention in the conversion of hydrocarbons, it is possible to obtain an improved cracking reaction. By providing a regenerative furnace in which uniform mixing of fuel and air or of hotter and colder combustion gases is obtainable before the gases contact the main refractory checkerworks, uniform and even heating of the refractory checkerworks is made possible with the result that overcracking and undercracking of the hydrocarbon feed is substantially eliminated. By preventing over- and undercracking of the hydrocarbon feed, the formation of carbonaceous materials, which may result in furnace shutdown, is obviated. Furthermore, by substantially eliminating the occurrence of secondary reactions, a product yield is made possible which is higher than that obtainable with conventional furnaces.

As will be evident to those skilled in the art, various modifications of this invention can be made or followed without departing from the spirit or scope of the disclosure.

I claim:

1. In a regenerative furnace having a combustion chamber in alignment with the main refractory masses disposed therein, the improvement which comprises a first and a second refractory mass positioned within said combustion chamber, said masses being spaced apart from one another and from said main refractory masses; passageways extending through said first and second refractory masses substantially parallel to the axis of said furnace; and means for laterally introducing fuel into said passageways.

2. In a regenerative furnace comprising at least two main refractory masses disposed in longitudinal alignment and spaced apart so as to form a combustion chamber therebetween and having passageways therethrough parallel to the axis of said furnace and communicating with said combustion chamber, the improvement which comprises a pair of perforate gas distribution members formed of refractory material positioned within said combustion chamber, said members being spaced apart from one another and from said main refractory masses and means for laterally introducing fuel into the perforations of said gas distribution members.

3. In a regenerative furnace comprising at least two main refractory masses spaced apart so as to form a combustion chamber therebetween and having passageways therethrough communicating with said combustion chamber, the improvement which comprises a first and a second refractory mass disposed within said combustion chamber, said masses being spaced apart from one another and from said main refractory masses; first passageways extending through said first and second refractory masses substantially parallel to the passageways of said main refractory masses; second passageways extending through each said first and second refractory masses and positioned between said first passageways; conduits extending through said first and second refractory masses communicating said first passageways with said second passageways; means for laterally introducing a fluid into said second passageways of said first refractory mass;

and means for laterally introducing a fluid into said second passageways of said second refractory mass.

4. In a regenerative furnace comprising at least two main refractory masses spaced apart so as to form a combustion chamber therebetween of substantially rectangular cross-section and having passageways therethrough communicating with said combustion chamber, the improvement which comprises a refractory column positioned within and extending between two opposite walls of said combustion chamber, said column having a substantially elliptical horizontal cross-section, the long axis of said cross-section being substantially parallel to the axis of said furnace; a pair of constricted passageways formed between said column and two of the walls of said combustion chamber; and means for introducing fuel into said constricted passageways.

5. A regenerative furnace which comprises, in combination, an elongated shell; a first refractory mass disposed in one end portion of said shell; a second refractory mass disposed in the other end portion of said shell, said refractory masses having passageways extending therethrough substantially parallel to the longitudinal axis of said shell; a combustion chamber disposed within said shell between said first and second refractory masses; a third and a fourth refractory mass, each substantially shorter in length than said first and second refractory masses, disposed within said combustion chamber, said third and fourth refractory masses being spaced apart from one another and from said first and second refractory masses; rows of longitudinal openings formed in each said third and fourth refractory masses so as to provide longitudinal passageways therethrough which are substantially in horizontal and vertical alignment; transverse openings formed in and extending across each said third and fourth refractory masses between said rows of longitudinal openings so as to provide transverse passageways therethrough; conduits formed in each said third and fourth refractory mass communicating said transverse passageways with said longitudinal passageways; means for introducing a fluid into said transverse passageways of said third refractory mass; means for introducing a fluid into said transverse passageways of said fourth refractory mass; and means for passing air and material to be converted into and through said refractory masses.

6. The regenerative furnace of claim 5 in which each said longitudinal passageway is in the form of a venturi comprising a diverging section and a converging section connected by a throat section and said conduits communicate with said passageways at said throat section.

7. A regenerative furnace which comprises, in combination, an elongated shell; a first refractory mass disposed in one end portion of said shell; a second refractory mass disposed in the other end portion of said shell; said refractory masses having passageways extending therethrough substantially parallel to the longitudinal axis of said shell; a combustion chamber disposed within said shell between said first and second refractory masses; a third and a fourth refractory mass, each substantially shorter in length than said first and second refractory masses, disposed within said combustion chamber, said third and fourth refractory masses being spaced apart from one another and from said first and second refractory masses; rows of longitudinal openings formed in each said third and fourth refractory masses so as to provide longitudinal passageways therethrough which are substantially in horizontal and vertical alignment; vertical openings formed in and extending from top to bottom each said third and fourth refractory masses between said rows of longitudinal openings so as to provide vertical passageways therethrough; conduits formed in each said third and fourth refractory masses communicating said vertical passageways with said longitudinal passageways; means for introducing a fluid into said vertical passageways of said third refractory mass; means for introducing a fluid into said vertical passageways of said fourth refractory mass; and means for passing air and material to be converted into and through said refractory masses.

8. The regenerative furnace of claim 7 in which each said longitudinal passageway is in the form of a venturi comprising a diverging section and a converging section connected by a throat section and said conduits communicate with said passageways at said throat section.

9. The regenerative furnace of claim 8 in which said conduits intersect said throat section at points diametrically opposite one another.

10. A regenerative furnace which comprises, in combination, an elongated shell; a first refractory mass disposed in one end portion of said shell; a second refractory mass disposed in the other end portion of said shell, said refractory masses having passageways extending therethrough substantially parallel to the longitudinal axis of said shell; a combustion chamber disposed within said shell between said first and second refractory masses; a third and a fourth refractory mass, each substantially shorter in length than said first and second refractory masses, disposed within said combustion chamber, said third and fourth refractory masses being spaced apart from one another and from said first and second refractory masses; rows of longitudinal openings formed in each said third and fourth refractory masses so as to provide longitudinal passageways therethrough which are substantially in horizontal and vertical alignment; transverse openings formed in and extending across each said third and fourth refractory masses between said rows of longitudinal openings so as to provide transverse passageways therethrough; vertical openings formed in and extending from top to bottom each said third and fourth refractory masses between said rows of longitudinal openings so as to provide vertical passageways therethrough, said vertical openings being offset longitudinally from said tranverse openings; conduits communicating said longitudinal passageways with said transverse passageways and said vertical passageways; means for introducing a fluid into said transverse and vertical passageways of said third refractory mass; means for introducing a fluid into said transverse and vertical passageways of said fourth refractory mass; and means for passing air and material to be converted into and through said refractory masses.

11. The regenerative furnace of claim 10 in which each said longitudinal passageway is in the form of a venturi comprising a diverging section and a converging section connected by a throat section and said conduits communicate with said passageways at said throat section.

12. The regenerative furnace of claim 11 in which said conduits communicating said longitudinal passageways and said transverse passageways are diametrically opposite one another and said conduits communicating said longitudinal passageways and said vertical passageways are diametrically opposite one another.

13. A process for the conversion of hydrocarbons which comprises passing heated air into a combustion zone; flowing said air through a portion of said combustion zone as a plurality of air streams; introducing fuel laterally into said plurality of said streams so as to form a plurality of combustible mixtures of substantially uniform composition; burning said combustible mixtures within said combustion zone; redistributing the resulting combustion products within said combustion zone by flowing same as a plurality of gas streams through another portion of said zone; passing said combustion products from said combustion zone into a refractory checkerwork; flowing said combustion products evenly and uniformly through said refractory checkerwork so as to heat said checkerwork; terminating the supply of air and fuel to said combustion zone; passing material to be converted through said refractory checkerwork and said combustion zone to effect the desired conversion; and withdrawing converted material from said combustion zone.

14. The process of claim 13 in which said fuel is introduced laterally into each said air streams at two substantially diametrically opposed points.

15. The process of claim 13 in which said fuel is introduced laterally into each said air streams at four points, the first two of said points being substantially diametrically opposed and offset longitudinally from the second two of said points, said second two points also being substantially diametrically opposed.

16. A process for the conversion of hydrocarbons which comprises passing air through a first refractory checkerwork in order to heat said air; passing said heated air into a combustion zone; flowing said air through a portion of said combustion zone as a plurality of air streams; introducing fuel laterally into said plurality of air streams so as to form a plurality of combustible mixtures of substantially uniform composition; burning said combustible mixtures within said combustion zone; redistributing the resulting combustion products within said combustion zone by flowing same as a plurality of gas streams through another portion of said zone; passing said combustion products from said combustion zone into a second refractory checkerwork; flowing said combustion products evenly and uniformly through said second refractory checkerwork so as to heat said checkerwork; terminating the supply of air and fuel to said combustion zone; passing material to be converted into and through said second refractory checkerwork in order to effect the desired conversion; passing the resulting reaction products into said combustion zone; redistributing said reaction products within said combustion zone by flowing same as a plurality of gas streams through portions of said zone; passing said reaction products from said combustion zone into said first refractory checkerwork; flowing said reaction products evenly and uniformly through said first refractory checkerwork in order to cool said products to a temperature at which they are stable; and removing said cooled reaction products from said first refractory checkerwork.

17. The process of claim 16 in which said fuel is introduced laterally into each said air streams at two substantially diametrically opposed points.

18. The process of claim 16 in which said fuel is introduced laterally into each said air streams at four points, the first two of said points being substantially diametrically opposed and offset longitudinally from the second two of said points, said second two points also being substantially diametrically opposed.

References Cited in the file of this patent

UNITED STATES PATENTS

| 1,112,066 | Hollis | Sept. 29, 1914 |
| 1,561,389 | Wollers | Nov. 10, 1925 |
| 1,677,811 | Bowen | July 17, 1928 |
| 2,319,679 | Hasche et al. | May 18, 1943 |

FOREIGN PATENTS

| 583,851 | Germany | Sept. 13, 1933 |